US012613138B2

(12) United States Patent
Van Vlierberghe et al.

(10) Patent No.: US 12,613,138 B2
(45) Date of Patent: Apr. 28, 2026

(54) METHOD AND SYSTEM FOR DETERMINING A TEMPERATURE VALUE OF A MOLTEN METAL BATH

(71) Applicant: Heraeus Electro-Nite International N.V., Houthalen (BE)

(72) Inventors: Michel Van Vlierberghe, Houthalen (BE); Gert Janssen, Houthalen (BE); Guido Neyens, Houthalen (BE)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 350 days.

(21) Appl. No.: 18/264,371

(22) PCT Filed: Feb. 7, 2022

(86) PCT No.: PCT/EP2022/052857
§ 371 (c)(1),
(2) Date: Aug. 4, 2023

(87) PCT Pub. No.: WO2022/171562
PCT Pub. Date: Aug. 18, 2022

(65) Prior Publication Data
US 2024/0102862 A1 Mar. 28, 2024

(30) Foreign Application Priority Data
Feb. 10, 2021 (EP) ..................................... 21156364

(51) Int. Cl.
*G01J 5/00* (2022.01)
*G01J 5/0821* (2022.01)
*B22D 2/00* (2006.01)

(52) U.S. Cl.
CPC ............. *G01J 5/004* (2013.01); *G01J 5/0044* (2013.01); *G01J 5/0821* (2013.01); *B22D 2/006* (2013.01)

(58) Field of Classification Search
CPC .......... B22D 2/006; Y02P 10/20; G01J 5/004; G01J 5/042; G01J 5/0044; G01J 5/0047; G01J 5/0821
See application file for complete search history.

(56) References Cited

U.S. PATENT DOCUMENTS 4,882,930 A * 11/1989 Nagy ...................... G01N 11/04
73/54.11
10,378,824 B2 * 8/2019 Neyens ................... G01J 5/048
(Continued)

FOREIGN PATENT DOCUMENTS

AU 2014 250 666 A1 11/2014
EP 3051264 B1 11/2017
(Continued)

OTHER PUBLICATIONS

Computer translation of H05-9546 A (Year: 2025).*
Computer translation of JP H05-9546-A (Year: 2025).*
Computer translation of JP_H059596_A (Year: 2026).*

*Primary Examiner* — Randy W Gibson
(74) *Attorney, Agent, or Firm* — Blank Rome LLP

(57) ABSTRACT

The present invention relates to a method and a system for determining a temperature value of a molten metal bath. The method according to the invention has been proven to be especially suitable for installations of metallurgical vessels which are constantly moved during the metal making process.

17 Claims, 6 Drawing Sheets

(56) References Cited

U.S. PATENT DOCUMENTS

| | | | |
|---|---|---|---|
| 2003/0002560 A1 | 1/2003 | Yamanaka et al. | |
| 2003/0004602 A1 | 1/2003 | Koffron et al. | |
| 2014/0321504 A1* | 10/2014 | Neyens ................ | G01J 5/0821 |
| | | | 374/139 |
| 2018/0180484 A1 | 6/2018 | Kendall et al. | |

FOREIGN PATENT DOCUMENTS

| | | | |
|---|---|---|---|
| EP | 3051262 | B1 | 7/2018 |
| EP | 3290881 | B1 | 8/2019 |
| EP | 2799824 | B1 | 10/2019 |
| EP | 2940441 | B1 | 1/2020 |
| JP | S5855725 | A | 4/1893 |
| JP | H05 9546 | A | 1/1993 |
| JP | H09166495 | A | 6/1997 |
| JP | H09304185 | A | 11/1997 |
| JP | H10185698 | A | 7/1998 |
| JP | 2000356477 | A | 12/2000 |
| WO | 2008031469 | A1 | 3/2008 |

* cited by examiner

A                          B                          C

30

50

METHOD AND SYSTEM FOR DETERMINING A TEMPERATURE VALUE OF A MOLTEN METAL BATH

The present invention relates to a method and a system for determining a temperature value of a molten metal bath.

The temperature of a molten metal bath in a metallurgical vessel is a critical parameter during the metal making process, which determines the quality of the resulting product. A possible means for measuring the temperature of the molten metal bath, particularly of iron or steel in a melting environment of an electric arc furnace (EAF), involves immersing an optical fiber surrounded by a metal tube into the molten metal. An optical fiber surrounded by a metal tube is often also referred to as optical cored wire.

For measuring the temperature of the molten metal bath, the optical cored wire can be fed into the metallurgical vessel. The leading tip of the optical cored wire is immersed into the molten metal bath, encountering on its way a hot atmosphere first, followed by a slag layer and then the molten metal bath. Once a portion of the optical cored wire is immersed below the surface of the molten metal bath, the optical fiber can convey thermal radiation received from the molten metal to a detector, e.g. a pyrometer. Suitable instrumentation can be associated with the detector for determining the temperature of the molten metal bath. During this measurement, the immersed portion of the optical cored wire may be partly or completely consumed by the molten metal bath. Once the temperature measurement has been concluded, the tip of the optical cored wire can be retracted from the molten metal bath. The tip of the retracted optical cored wire will become the new leading tip for the next temperature measurement.

Such a device is suitable for on-demand and semi-continuous temperature measurements in form of a series of immersion cycles. An operator can obtain a temperature measurement without any direct intervention with the harsh environment proximate to the metallurgical vessel.

To provide accurate measurements, blackbody conditions must be ensured in the vicinity of the immersed leading tip of the optical fiber while a measurement is obtained. On the one hand, the fiber must be immersed to a sufficient depth below the metal bath surface and to a location within the vessel which is representative for the temperature of the liquid metal bath. On the other hand, a deep immersion will increase the flotational forces on the optical cored wire and increase the consumption during a measuring sequence.

Typically, a device comprising an optical cored wire for temperature measurements is installed in a fixed manner in an upper part of the vessel containing the molten metal, for example located at a side wall or a part of the roof. Due to the central position of the electrodes of the systems, the measurement equipment is usually not installed centrally above the molten metal bath. In a typical metallurgical process, the vessel is moved during the process to help the homogenization of the metal melt. This constant movement is commonly referred to as "furnace rocking". As the skilled person will understand, the vessel is part of the furnace. This tilting, sliding or rotational motion results in a varying distance of the surface of the molten metal bath to the installation of the optical cored wire, hindering the immersion of the optical cored wire to a constant immersion depth during all stages of the process.

US2003004602A1 discloses a method to control the tilting of the furnace in dependence of the process parameters of a metallurgical process in order to optimize the yield of the respective process. While the importance of the tilting is recognized for the process itself, an impact on measurements accompanying the process is not addressed.

Several prior art documents disclose feeding methods for an optical cored wire to improve the data quality of a temperature measurement. For example, US2018180484A1 discloses a method for measuring the temperature of a molten metal bath comprising a feeding scheme with two feeding speeds followed by a stationary period, after which the temperature measurement is conducted. While this method solves some of the problems known before, it does not address constantly changing conditions during the metal making process.

In view of the prior art, there is the need for a measurement method and a system which consider the accompanying circumstances of a metal making process and an efficient way of using the method and the system.

The objective of the invention is thus to provide an improved method for determining a temperature value of a molten metal bath with an optical cored wire which solves at least one of the problems discussed above. In particular, one of the objects is to provide an improved method to more reliably determine temperature values in a constantly moving metallurgical vessel. Furthermore, it is an objective to provide a method to obtain the temperature value at a certain immersion depth of the optical cored wire below the surface of the molten metal bath. An additional aspect of the objective of the present invention is to provide a method which allows an efficient use of consumable optical cored wire.

A further object of the invention is to provide an improved system for carrying out the inventive method.

These objects are attained by the subject-matter defined in the independent claims.

The invention provides a method for determining a temperature value of a molten metal bath in a furnace with a device comprising an optical cored wire and a detector, wherein the furnace has a furnace inclination, the method comprising (a) providing a set of data relating furnace inclination values Fl to corresponding measurement profiles MP;

(b) determining a furnace inclination value Fl(n) for a point in time t(n);

(c) choosing a measurement profile MP(n) corresponding to the furnace inclination value Fl(n) from the provided set of data relating furnace inclination values Fl to corresponding measurement profiles MP;

(d) applying the measurement profile MP(n) at a point in time t(n) to obtain a measured temperature value.

Furthermore, the invention provides a system for determining a temperature value of a molten metal bath in a furnace, wherein the furnace has a furnace inclination, wherein the system comprises a device and a module and the module is adapted to interact with the device, wherein the device comprises an optical cored wire and a detector, wherein the module comprises a storage unit S, a processing unit P and a controlling unit C, wherein the storage unit S comprises:

a storage element S1 for providing a set of data relating furnace inclination values Fl to corresponding measurement profiles MP;

wherein the processing unit P comprises:

a processing element P1 for determining a furnace inclination Fl;

a processing element P2 for choosing a measurement profile MP(n) corresponding to a furnace inclination FI(n) from the provided set of data relating furnace inclination values to corresponding measurement profiles MP;

and wherein the controlling unit C comprises:

a controlling element C1 for applying the measurement profile MP(n) to obtain a measured temperature value.

Preferred embodiments are defined in the dependent claims. The preferred embodiments may be realized individually or in any possible combination.

The method according to the invention has been proven to be especially suitable for installations of metallurgical furnaces which can be constantly moved during the metal making process. Surprisingly it has been found that the data quality of the measurement depends on the measurement profile which is applied to obtain a measurement. Especially the feeding of the optical cored wire into the molten metal bath has been identified as factor which significantly influences the reliability of the obtainable data. The inventive method allows to determine temperature values with matching measurement protocols for different configurations of the metallurgical vessel containing the molten metal bath. In particular, it has been found that a constant immersion depth of the leading tip of the optical cored wire is a critical parameter for the obtainable measurement quality. By "quality" in this context it is referred to the obtained measurement accuracy compared to data acquired by the application a stationary installed standard thermocouple. Furthermore, the inventive method allows a positioning of the optical cored wire and its leading tip at a constant depth under the surface of the molten metal bath, which additionally makes it possible to obtain accurate temperature values with a minimal consumption of the optical cored wire. The term "consumption" as used herein refers to a disintegration of the optical cored wire, such as for example the melting and dissolution of the optical cored wire by and into the molten metal bath, a decomposition or burning of the whole optical cored wire or its different parts, and the like.

The invention provides a method for determining a temperature value of a molten metal bath.

"Determining a temperature value" may be used herein as a synonym for measuring a temperature. According to a preferred embodiment, the temperature value can be determined from a single point measurement or a multiple point measurement.

Throughout this application variables related to temperatures or temperature values will be referred to with an upper-case T, while variables related to points in time, durations or time in general will be referred to with a lower-case t.

A variable without a designated index, i.e. (n) or the like, will be used to define the variable in general. A variable with a designated index will be used to refer to this variable in a specific context. For example, FI refers to the general definition of the furnace inclination value, while FI(n) refers to a specific furnace inclination value.

As used herein, the term "molten metal bath" is used to describe a melt in a furnace, in particular in a vessel. An alternative term for "molten metal bath" known to a skilled person is "metal melt". The molten metal of the molten metal bath is not particularly restricted. According to a preferred embodiment, the molten metal is molten steel. The term molten metal bath does not exclude the presence of any solid or gaseous parts, including for example non-molten parts of the respective metal. The molten metal bath may be covered with a slag layer. The term "slag" refers to non-steel byproducts that are often produced in a steel making furnace and are typically present as a molten material that floats on top of the molten metal. Slag may comprise metal oxides, metal sulfides, calcium oxide, magnesium oxide, magnesite, dolomite, iron oxide, aluminum oxide, manganese oxide, silica, sulfur, phosphorous, or a combination thereof.

The temperature of metal melts differs and usually depends on the composition of the metal and the stage of the melting process. According to a preferred embodiment, the temperature of the molten metal bath is in the range of 1500-1800° C. and more preferably in the range of 1500-1700° C.

The molten metal bath of which the temperature is to be determined with the method according to the invention is located in a furnace.

Preferably, the furnace is a metallurgical plant comprising a vessel which contains the molten metal bath and installations fixedly mounted on or at the vessel. Such installations can for example be means for heating, as electrodes and means for measurements, as an installation comprising an optical cored wire.

The molten metal bath may be contained in a vessel comprising an entry point, suitable to feed an optical cored wire through. Such an entry point may be positioned in a side-wall panel, a roof covering the vessel, or a platform installed above the vessel, such as a platform as found in an eccentric bottom tapping (EBT) furnace. Preferably, the entry point is located at an EBT furnace platform.

As used herein, the term the "furnace inclination" refers to the degree by which the furnace and in particular the vessel containing the molten metal bath is tilted. Preferably, the tilting is defined relative to a pivoting axis $A_P$. Preferably, the pivoting axis $A_P$ defines an initial position. As the skilled person will understand, the furnace inclination is a direct consequence of the furnace rocking commonly applied during the metallurgical process. Preferably, the pivoting axis $A_P$ defining the initial position is oriented perpendicular to the bottom of the vessel containing the molten metal bath in case the bottom is flat. In the case of a rounded or otherwise formed bottom, the pivoting axis $A_P$ defining the initial position is preferably oriented perpendicular to a projected plane defined by the outer contour of the vessel. It may be understood that the pivoting axis $A_P$ must not be centrally arranged in the vessel; i.e. it must not be positioned at the half-width of the vessel. Especially in cases, in which the vessel is not build symmetrical, the position of the pivoting axis $A_P$ may be shifted to one side relative to a center defined by the width of the vessel.

In a preferred embodiment, the furnace inclination is defined by the angle between a horizontal plane and a reference plane that is tangent to the bottom of the body of the furnace, wherein, when the furnace is in its initial position, i.e. a neutral position, the reference plane is substantially parallel to the horizontal plane and/or to the surface of the molten metal bath.

Furnace inclination values are preferably given in degrees. Furnace inclination values can take positive or negative values, depending on the direction to which the vessel is tilted relative to the pivoting axis $A_P$ defining the initial position. Per definition, the initial position refers to a furnace inclination value of 0°. In other words, it is possible that positive values for the furnace inclination refer to a tilting in one direction relative to the pivoting axis $A_P$ defining the initial position and negative values refer to a tilting in the opposite direction. Typically, the tilting of the vessel relative to the pivoting axis $A_P$ defining the initial position ranges from +5° to −5°.

Preferably, the tilting of the furnace results in a motion of the molten metal bath. The skilled person will understand that the tilting influences the relative positioning and distances of the surface of the molten metal bath and the parts of the vessel building the interior surrounding, as for example a lid covering the vessel. Since the volume of the molten metal bath is constant after all solid material provided has been melted, the position of the surface level of the molten metal bath will on the one hand be influenced by the tilting of the furnace and on the other hand by the geometry of the inner body of the vessel.

In terms of the present invention, it is to be understood that a "tilting of the furnace" is referred to as the movement in one dimension; i.e. from side to another side or from front to back.

A furnace may be tilted over a range of angles by the use of a tilting device. Preferably, the tilting device comprises means selected from the group consisting of motor(s), gear(s), chain drive(s), hydraulics and combinations thereof.

In a preferred embodiment, the tilting of the furnace is carried out by an operator that manually operates the tilting device. In a further preferred embodiment, the tilting of the furnace is computer-controlled; for example, the tilting of the furnace is controlled by a processor or programmable logic controller. In such embodiments, the processor or programmable logic controller may command the tilting device to perform a sequence of small (equal or unequal) angular movements or a continuous angular movement.

Preferably, the vessel comprises a position from which the optical cored wire is fed. In a preferred embodiment, this position is located at an opening in the furnace; i.e. an entry point through which the optical cored wire is fed to enter the vessel.

Preferably, the position from which the optical cored wire is fed is not located on the pivoting axis $A_P$ In other words, the position from which the optical cored wire is fed is not located centrally in the vessel. A position "centrally in the vessel" hereby is to be understood as a point within the vessel, which is located at the half width of the diameter of the vessel. Preferably, the position from which the optical cored wire is fed is located next to a side wall of the vessel.

As the skilled person will understand, the resulting differences in the distance between the position from which the optical cored wire is fed to the surface of the molten metal bath will be the larger, the further apart this position is located from a central position in the vessel. In other words, the nearer the point is located to a side wall of the vessel, the more significant the influence of the tilting movement of the furnace will be.

In representative vessel configurations, the difference in the distance of the surface of the molten metal bath to the position from which the optical cored wire is fed may be up to 10 cm per degree of tilting; i.e. a tilting from +3° to −3° results in a difference of up to 60 cm in the distance of the surface of the molten metal bath to the position from which the optical cored wire is fed.

The invention provides a method for determining a temperature value with a device comprising an optical cored wire. Preferably, the optical cored wire is an optical fiber laterally surrounded by a metal tube. Preferably, the optical fiber is a flexible, transparent fiber. Optical fibers are most often used as means to transmit light, especially in the IR wavelength range, between the two ends of the fiber. Preferably, the optical fiber is formed from glass or plastic, more preferably from quartz glass. Preferably, the optical fiber is selected from the group consisting of graded index fibers and single-mode step index fibers.

The metal tube surrounding the optical fiber can fully encircle the optical fiber or it can be at least partially open so that the casing is not fully encircling the optical fiber.

Preferably, the metal of the metal tube surrounding the optical fiber is iron or steel, preferably stainless steel.

In a preferred embodiment the linear density of the optical cored wire is in the range of 25-80 g/m, more preferably in the range of 35-70 g/m. The linear density is defined by the mass per unit length.

Preferably, the optical cored wire is laterally surrounded by at least one additional metal tube, i.e. at least two metal tubes surround the optical fiber laterally. Preferably, the optical cored wire is centrally arranged in the at least one additional metal tube.

Preferably, the at least one additional metal tube is not in contact with the optical cored wire. More preferably, the void space between these at least two metal tubes is at least partially filled with a material selected from the group consisting of gaseous or solid materials or a combination thereof. The solid material is preferably selected from the group consisting of inorganic materials, natural polymers, synthetic polymers and combinations thereof. The gaseous material is preferably a gas or a mixture of gases. More preferably, the gas is air or an inert gas.

According to a preferred embodiment, the optical cored wire comprises a plurality of separating elements arranged in the at least one metal tube, forming at least one compartment between the separating elements. Here, the term "compartment" relates to the volume between the different separating elements in the tube. The term "separating elements" relates to parts arranged inside the tube subdividing the volume within the tube. Preferably, separating elements are disc-shaped elements that are arranged inside the tube comprising an opening, through which the optical cored wire is extending, and which can at least partly support the optical cored wire. The material of the separating elements is preferably selected from the group consisting of silicone, preferably two-component silicone, rubber, leather, cork, metal and combinations thereof.

Preferably, the metal tube surrounding the optical cored wire is surrounded by a further layer. According to a particular preferred element, the further layer is at least one further metal tube layer or at least a layer comprising a plurality of pieces, preferably fibers.

In a further preferred embodiment, the material of the at least one additional layer has the form of a web, a net, a woven or a knitted structure.

Preferably, the at least one additional layer comprises a non-metallic material, most preferably an organic material.

It is to be understood that the optical cored wire may comprise any combination of the above described configurations. According to a particular preferred embodiment, the optical cored wire is laterally surrounded by a further layer and a second metal tube.

The device used to apply the method according to the invention further comprises a detector. The detector is coupled to one end of the optical cored wire and receives a light signal, in particular in the IR wavelength range, transmitted by the optical fiber. Preferably, the detector in the context of the present invention is a pyrometer.

The optical cored wire has an immersion end and an opposite end. The leading tip of the optical cored wire is the tip of the immersion end of the optical cored wire. Preferably, when the method according to the invention is applied, the optical cored wire is consumed in the direction from the immersion end towards the opposite end and after each measuring sequence, another part of the optical cored wire will be the immersion end; i.e. after each measurement sequence the leading tip is newly generated. The opposite end is connected to the detector and will not be consumed during a measurement.

In step (a) of the method according to the present invention a set of data relating furnace inclination values Fl to corresponding measurement profiles MP is provided.

Preferably, a set of data comprises data pairs in which one certain value of a type of data is assigned to a certain value of another type of data. More preferably, it comprises data pairs in which one certain value of a type of data is assigned to a model, a sequence of several steps or the like.

A measurement profile MP is to be understood as a sequence of steps which is carried out to obtain a value of interest. In the context of the present invention, the value of interest is the temperature of the molten metal bath.

In a preferred embodiment, the measurement profile MP defines at least a step of providing the leading tip of the optical cored wire at a first position p1 above the surface of the molten metal bath.

The first position p1 can be located above the vessel containing the molten metal bath or within the vessel. The leading tip at the first position p1 may or may not have contact with an optionally present slag layer.

Preferably, the first position p1 is not located on the pivoting axis $A_P$, i.e. the first position p1 is not located centrally above the molten metal bath. Preferably, the first position p1 is located next to a side wall of the vessel.

In a preferred embodiment, the measurement profile MP defines at least a step of feeding the leading tip of the optical cored wire from a first position p1 towards the molten metal bath to a second position p2.

The skilled person will understand that "providing the leading tip" and "feeding the leading tip" necessarily includes providing and feeding the optical cored wire, i.e. providing the optical cored wire having a leading tip and moving the optical cored wire with its leading tip.

The second position p2 is preferably located below the first position p1 in the direction defined from a point above the surface of the molten metal bath towards a point at the level of the surface of the molten metal bath.

Preferably, the measurement profile MP defines the feeding towards the molten metal bath from a first position p1 to a second position p2 during a time period within two points in time t0 and t2. It is to be understood, that t2 is later than t0.

Preferably, the measurement profile MP defines at least one feeding velocity $v_{fed}$ with which the leading tip of the optical cored wire is fed to a second position p2 from a first position p1 towards the molten metal bath.

It is to be understood, that the feeding velocity $v_{fed}$ refers to the average velocity of the leading tip during its feeding towards and below the surface of the molten metal bath.

Preferably, the feeding velocity $v_{fed}$ is defined in dependence of the defined distance between the first position p1 and the second position p2. Defining the feeding velocity $v_{fed}$ in dependence of the distance between the first position p1 and the second position p2 preferably results in a time period during which the leading tip of the optical cored wire is exposed to the harsh environment inside the metallurgical vessel which is constant independent of the distance the leading tip has to be fed from the first position p1 to the second position p2. Preferably, the feeding velocity $v_{fed}$ is defined the faster, the longer the distance between the first position p1 and the second position p2 is defined.

In a preferred embodiment, the feeding is conducted with at least two feeding velocities $v_{fed}1$ and $v_{fed}2$. It is to be understood, that the feeding velocities $v_{fed}1$ and $v_{fed}2$ refer to average velocities the leading tip of the optical cored wire is fed with.

Preferably, the leading tip of the optical cored wire passes the surface of the molten metal bath at a third position p3. The third position p3 is preferably located below the first position p1 and above the second position p2.

The surface of the molten metal bath can be the surface facing the atmosphere of the vessel or, in case of the presence of a slag layer, the surface facing the slag layer.

Preferably, the second position p2 is in an immersion depth i1 under the surface of the molten metal bath. The immersion depth in terms of the present invention is to be understood as the distance of the leading tip from the surface of the molten metal bath and is determined along an axis perpendicular to the surface. In other words, the immersion depth i1 is the distance between the third position p3 and the second position p2.

Preferably, the leading tip of the optical cored wire is located below the surface of the molten metal bath during a time period within the two points in time t1 and t2. It is to be understood, that the two points in time t1 and t2 are later than the point in time t0 and that the point in time t2 is later than the point in time t1. The point in time t1 is the point in time the leading tip enters the molten metal bath; i.e. the point in time from which it is immersed below the surface of the molten metal bath. In other words, t1 is the point in time the leading tip passes the third position p3.

Preferably, the measurement profile MP defines a first feeding velocity $v_{fed}1$ with which the leading tip is fed during a time period within the points in time t0 and t1 and a second feeding velocity $v_{fed}2$ with which the leading tip is fed during a time period within the points in time t1 and t2.

In a preferred embodiment, the second feeding velocity $v_{fed}2$ comprises more than one feeding velocity.

It may be advantageous, that the angle of immersion is in the range of 45-90°, preferably in the range of 60-90°, most preferably the angle of immersion is 90°. This angle is defined as the angle between the surface of the molten metal bath and an axis along the optical cored wire in an optimal straight line. 90° may be understood as an immersion of the optical cored wire perpendicular to the surface of the molten metal bath.

In a preferred embodiment, the measurement profile MP defines at least a step of obtaining temperature information within a measuring time period within the points in time t0 and t2. Preferably, the measurement profile MP defines a step of obtaining temperature information within a measuring time period within the points in time t1 and t2.

To obtain temperature information, the radiation emitted by the molten metal bath, especially in the IR wavelength range, and conveyed a by the optical cored wire to the detector is recorded. The intensity and/or spectral information of the radiation may be processed by a processing unit connected to the detector. The leading tip of the optical cored wire is preferably immersed under the surface of the molten metal bath at the point in time or during the measuring time period the temperature is obtained.

Preferably, the temperature information is obtained in a step resulting in the determination of a measured temperature value. According to a preferred embodiment, the temperature value can be determined from a single point measurement or a multiple point measurement Preferably, the measured temperature value is the mean value of the series of data points. More preferably, the measured temperature value is derived based on the application of an algorithm processing the series of data points.

According to a preferred embodiment, the measurement profile MP defines a step within a stationary time period within the points in time t0 and t2, during which the feeding of the leading tip of the optical cored wire is paused with or the leading tip of the optical cored wire is fed with a low speed. Preferably, the measurement profile MP defines the stationary time period within the points in time t1 and t2. The term "pausing with the feeding of the leading tip" used herein means, that the leading tip is not actively moved. Both alternatives, a pausing of the feeding or a feeding with a low speed, result in a movement of the position of the leading tip towards the surface of the molten metal bath due to the consumption. Nevertheless, the leading tip is still immersed below the surface of the molten metal bath.

A low speed is preferably a speed lower than 0.2 m/s, more preferably a speed lower than 0.1 m/s.

In a preferred embodiment, the measurement profile MP defines at least a step of retracting the leading tip of the optical cored wire with a velocity $v_{ret}$ to a position above the molten metal bath. The velocity $v_{ret}$ may be slower, the same or faster than the feeding velocity $v_{fed}$.

The skilled person will understand that retracting the leading tip of the optical cored wire is a movement in the direction from the molten metal bath to a position above the molten metal bath.

Preferably, the leading tip of the optical cored wire is retracted towards a position above the surface of the molten metal bath after the point in time t2.

Preferably, the leading tip of the optical cored wire is retracted towards the first position p1. Since the leading tip of the optical cored wire is consumed and constantly re-build during a measurement sequence as defined in a measurement profile MP, the distance between the leading tip and the first position p1 will shorten during the time period the leading tip is immersed below the surface of the molten metal bath, even when the feeding is paused with. Therefore, the distance by which the re-build leading tip of the optical cored wire is retracted will preferably be shorter than the distance the initial leading tip of the optical cored wire was fed from the first position p1 to the second position p2.

Preferably, the leading tip of the optical cored wire is retracted to a fourth position p4.

Preferably, the fourth position p4 is the same as the first position p1.

Preferably, the measurement profile MP defines at least one of the steps of (i) providing the optical cored wire with its leading tip above the surface of the molten metal bath at a first position p1;

(ii) feeding the leading tip directed towards the molten metal bath from the first position p1 with at least one feeding velocity $v_{fed}$ for a time period within the points in time t0 and t2 to a second position p2 in an immersion depth i1 below the surface of the molten metal bath, wherein the leading tip of the optical cored wire is below the surface of the molten metal bath during a time period within the points in time t1 and t2;

(iii) obtaining temperature information within a measuring time period within the points in time t1 and t2;

(iv) retracting the optical cored wire with a velocity $v_{ret}$ to a position above the molten metal bath.

Preferably, steps (i), (ii) and (iv) are performed in consecutive order.

Preferably, step (iii) is at least partly performed during step (ii).

Preferably, the set of data relating furnace inclination values Fl to corresponding measurement profiles MP relates the definition of at least one parameter in at least one step of a measurement profile MP to a furnace inclination value Fl.

The parameters in this context are to be understood as the positions, velocities and points in time defined in the at least one step as defined in a measurement profile MP.

Preferably, the distance between the first position p1 and a second position p2 in a measurement profile MP is defined based on a furnace inclination value Fl.

Preferably, the distance between the first position p1 and the second position p2 is adapted by 2 cm to 20 cm, preferably by 5 cm to 15 cm, most preferably by 8 cm to 12 cm for each degree of inclination of the furnace from a predetermined initial position. The term "predetermined initial position" refers to the position which has by definition to a furnace inclination value of 0°; i.e. the position which defines a neutral position.

In a preferred embodiment, the distance between the first position p1 and the second position p2 is adapted by the same length for each degree of inclination of the furnace in a first direction and in a second direction from a predetermined initial position. This embodiment may be preferred when the vessel containing the molten metal bath is built symmetrical.

In a further preferred embodiment, the distance between the first position p1 and the second position p2 is adapted by a first length for each degree of inclination of the furnace in a first direction and adapted by a second length for each degree of inclination of the furnace in a second direction from a predetermined initial position. This embodiment may be preferred when the vessel is built asymmetrical or if the pivoting axis $A_P$ is not centrally positioned.

Preferably, the distance between the first position p1 and the second position p2 is extended by 2 cm to 20 cm, preferably by 5 cm to 15 cm, most preferably by 8 cm to 12 cm, for each degree of inclination of the furnace in a first direction from a predetermined initial position.

Preferably, the distance between the first position p1 and the second position p2 is shortened by 2 cm to 20 cm, preferably 5 cm to 15 cm, most preferably by 8 cm to 12 cm, for each degree of inclination of the furnace in a second direction from a predetermined initial position.

Preferably, the distance between the second position p2 and the fourth position p4 in a measurement profile MP is defined based on a furnace inclination value Fl.

Preferably, the distance between the first position p1 and the second position p2 is adapted by the same length as the distance between the second position p2 and the fourth position p4 for each degree of inclination of the furnace.

Preferably, the distance between the second position p2 and the fourth position p4 is adapted by 2 cm to 20 cm, preferably by 5 cm to 15 cm, most preferably by 8 cm to 12 cm for each degree of inclination of the furnace from a predetermined initial position.

In a preferred embodiment, the distance between the second position p2 and the fourth position p4 is adapted by the same length for each degree of inclination of the furnace in a first direction and in a second direction from a predetermined initial position. This embodiment may be preferred when the vessel containing the molten metal bath is built symmetrical.

In a further preferred embodiment, the distance between the second position p2 and the fourth position p4 is adapted by a first length for each degree of inclination of the furnace in a first direction and adapted by a second length for each degree of inclination of the furnace in a second direction from a predetermined initial position. This embodiment may be preferred when the vessel is built asymmetrical or if the pivoting axis $A_p$ is not centrally positioned.

Preferably, the distance between the second position p2 and the fourth position p4 is extended by 2 cm to 20 cm, preferably by 5 cm to 15 cm, most preferably by 8 cm to 12 cm, for each degree of inclination of the furnace in a first direction from a predetermined initial position.

Preferably, the distance between the second position p2 and the fourth position p4 is shortened by 2 cm to 20 cm, preferably 5 cm to 15 cm, most preferably by 8 cm to 12 cm, for each degree of inclination of the furnace in a second direction from a predetermined initial position.

Preferably, the set of data relating furnace inclination values Fl to corresponding measurement profiles MP additionally relates the measurement profiles to characteristics of the optical cored wire.

Preferably, the characteristic of the optical cored wire is its linear density. The linear density is defined by the mass per unit length.

Preferably, the duration of the time period within the points in time t0 and t2 of a measurement profile MP is defined the longer, the higher the linear density of an optical cored wire is.

Preferably, the feeding velocity $v_{fed}$ of a measurement profile MP is defined the lower, the higher the linear density of an optical cored wire is.

In step (b) of the method according to the present invention a furnace inclination value Fl(n) is determined for a point in time t(n).

Preferably, the furnace inclination value Fl(n) refers to the value of the furnace inclination at the point in time t(n).

There is a range of possibilities available to determine a furnace inclination value Fl. In a preferred embodiment, a furnace inclination value Fl is determined by a direct measurement based on a detecting system implemented in, on or at the metallurgical vessel, an input based on data of the process control mechanism of the furnace inclination or an input based on the known point in time of the metal making process. A detecting system may include, but is not limited to, rotary variable capacitance sensors, inductive sensors, and DC servo motor sensors.

In step (c) of the method according to the present invention a measurement profile MP(n) corresponding to the furnace inclination value Fl(n) from the provided set of data relating furnace inclination values to corresponding measurement profiles MP is chosen.

In step (d) of the method according to the present invention the measurement profile MP(n) is applied at a point in time t(n) to obtain a measured temperature value.

The application of the measurement profile MP(n) results in the determination of the measured temperature value of the molten metal bath at the point in time t(n).

Preferably, the temperature information is obtained in a predetermined immersion depth i1. Obtaining the temperature information in a predetermined immersion depth will lead to the most accurate and reproducible measurement results.

Preferably, the immersion depth i1 is constant; i.e. the immersion depth i1 is independent of the furnace inclination value Fl. In other words, the measurement profile MP(n) chosen in step (c) is chosen in such a relation to the furnace inclination value Fl(n), that the feeding of the leading tip of the optical cored wire will lead to the immersion of the leading tip to a certain immersion depth i1. As the skilled person will understand, the immersion depth i1 may be controlled by the distance between the first position p1 and the second position p2, which is defined in a measurement profile MP.

Preferably, steps (b) to (d) are performed in consecutive order.

Preferably, step (a) is performed prior to steps (c) to (d).

More preferably, the method is performed in one of the following orders:

(a)-(b)-(c)-(d) or (b)-(a)-(c)-(d).

In a preferred embodiment, the set of data provided in step (a) further relates the level of the surface of the molten metal bath to the measurement profiles MP.

Preferably, the method comprises determining the level of the surface of the molten metal bath.

A broad variety of methods for determining the level of a molten metal bath is known to a skilled person. Such methods include but are not limited to the determination of the loaded mass of raw material in conjunction with the known density of the molten material and the design of the vessel or the application of a measuring device. Such a measuring device may be a contact based sensor as a dipping lance, or a non-contact based sensor which may be based on radar, microwave, infrared, electromagnetic, inductive or optical signal detection, as well as a sensor utilizing indirect methods like the measurement of the pressure inside the vessel. Preferably, the sensor is located above the molten metal bath within the vessel such that the sensor captures data indicative of the distance between the sensor and the surface of the molten metal.

Preferably, the level of the molten metal bath is determined in the initial position; i.e. at a furnace inclination value Fl of 0°.

In a preferred embodiment, the set of data provided in step (a) further relates the position of the leading tip of the optical cored wire to the measurement profiles MP Preferably, the method comprises determining the position of the leading tip of the optical cored wire.

Preferably, the position of the leading tip of the optical cored wire is determined by means of a sensor. Such a sensor may be selected from the group consisting of a pneumatic sensor, an inductive sensor and an optical sensor.

According to a preferred embodiment of the invention, the procedure described herein is carried out repeatedly.

The invention furthermore provides a system for determining a temperature value of a molten metal bath in a furnace, wherein the furnace has a furnace inclination. The system comprises a device and a module, wherein the module is adapted to interact with the device.

Preferably, the system is configured to perform the method according to the invention, wherein the method comprises the following steps (a) providing a set of data relating furnace inclination values Fl to corresponding measurement profiles MP;

(b) determining a furnace inclination value Fl(n) for a point in time t(n);

(c) choosing a measurement profile MP(n) corresponding to the furnace inclination value Fl(n) from the provided set of data relating furnace inclination values Fl to corresponding measurement profiles MP;

(d) applying the measurement profile MP(n) at a point in time t(n) to obtain a measured temperature value.

For preferred embodiments related to the inventive method, it is referred to the preferred embodiments given above.

The system according to the invention comprises a device, wherein the device comprises an optical cored wire and a detector. For preferred embodiments related to the optical cored wire and the detector it is referred to the preferred embodiments given above for the inventive method.

The system according to the invention comprises a module, wherein the module comprises a storage unit S, a processing unit P and a controlling unit C.

Preferably, the storage unit S, the processing unit P and the controlling unit C are configured to interact with each other.

According to the invention, the storage unit S of the module comprises a storage element S1 for providing a set of data relating furnace inclination values Fl to corresponding measurement profiles MP.

According to the invention, the processing unit P of the module comprises a processing element P1 for determining a furnace inclination value Fl and a processing element P2 for choosing a measurement profile MP(n) corresponding to a furnace inclination Fl(n) from the provided set of data relating furnace inclination values Fl to corresponding measurement profiles MP.

In a preferred embodiment, the processing unit P is configured to process the information stored in the storage unit S.

According to the invention, the controlling unit C of the module comprises a controlling element C1 for applying the measurement profile MP(n) to obtain a measured temperature value. The controlling element C1 is preferably a processor or programmable logic.

In a preferred embodiment, the controlling unit C is configured to control the device.

In a preferred embodiment, the system comprises feeding means. In the context of the present invention, feeding means may be understood as means which allow the feeding of the optical cored wire into the molten metal bath. Such means may be selected from the group consisting of a feeder, a feeding control, a straightener and a guiding tube and combinations thereof.

According to a preferred embodiment, the system further comprises a coil, which accommodates the length of the optical cored wire.

According to a preferred embodiment, the system further comprises a tilting device. Preferably, the tilting device comprises one means selected from the group consisting of motor(s), gear(s), chain drive(s), hydraulics and combinations thereof.

According to a preferred embodiment, the controlling unit of the module comprises a controlling element C2 for controlling the tilting device. The controlling element C2 is preferably a processor or programmable logic.

The idea underlying the invention shall subsequently be described in more detail with respect to the embodiments shown in the figures. It should be understood, however, that the invention is not limited to the precise arrangements and instrumentalities shown. Herein:

Figure 1:
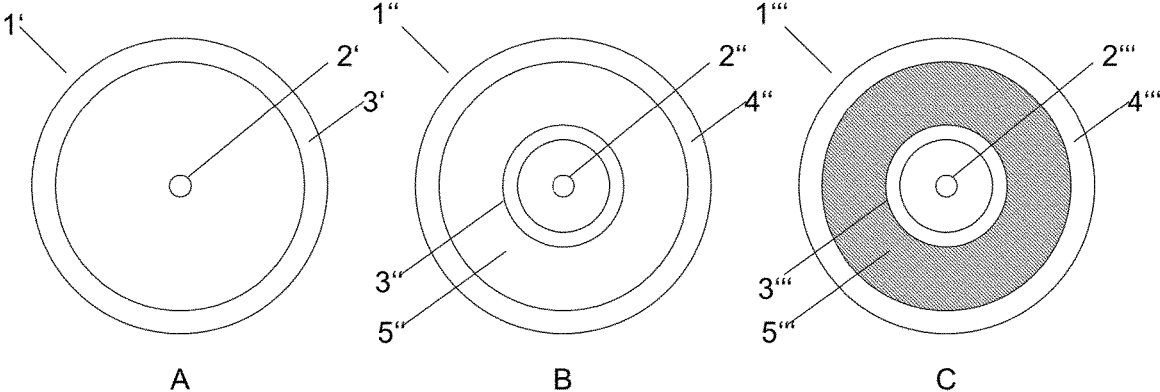
FIG. 1 shows schematic cross-sectional views of different designs of optical cored wires.

FIG. 1 shows schematic cross-sectional views of different designs of optical cored wires in accordance with exemplary embodiment of the invention. FIG. 1A shows an optical cored wire 1' which comprises an optical fiber 2' surrounded by a metal tube 3'.

FIG. 1 B shows an optical cored wire 1" which comprises an optical fiber 2" surrounded by a metal tube 3". A second metal tube 4" additionally surrounds metal tube 3". The void space between the two metal tubes 5" is not filled with a solid material; i.e. the void space may comprise a gas or a gas mixture.

FIG. 1 C shows an optical cored wire 1‴ which comprises an optical fiber 2‴ surrounded by a metal tube 3‴ and a second metal tube 4‴. The void space between the two metal tubes 5‴ is filled with a filler material, for example fibers from an organic material or e-glass.

Figure 2:
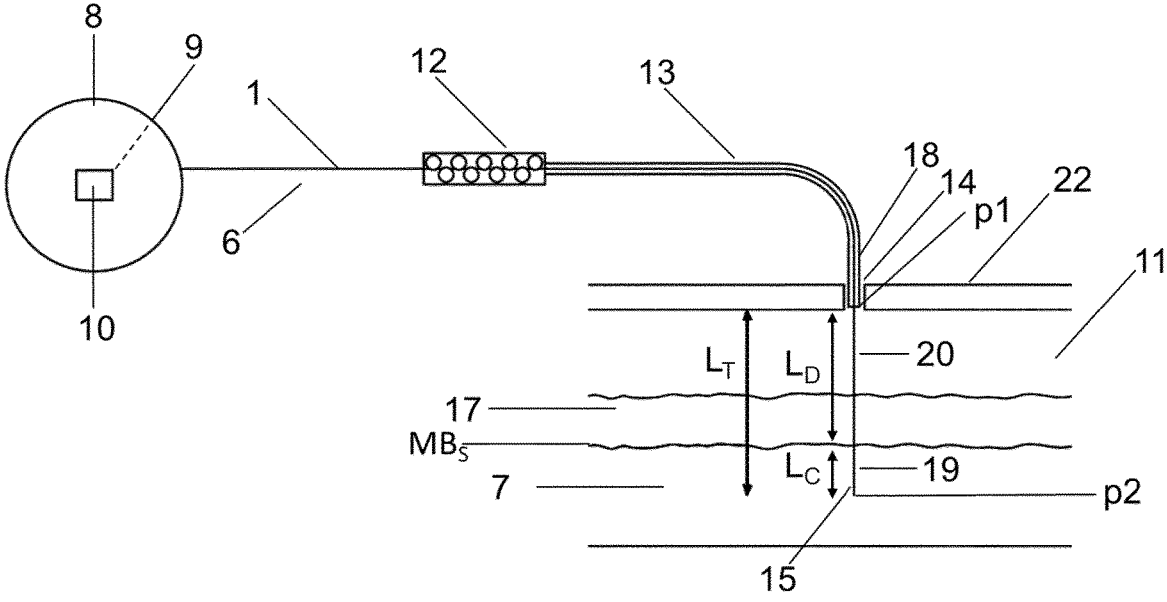
FIG. 2 shows a schematic view of an exemplary installation with a molten metal bath, of which the temperature shall be determined.

FIG. 2 shows a schematic view of an exemplary installation 6 with a molten metal bath 7, of which the temperature shall be determined.

The installation 6 comprises an optical cored wire 1 which is located at least partly on a coil 8 and is at least in part unwound from the coil 8 for conducting a measurement. One end of the optical cored wire 9 is connected to a detector 10 which in turn could be connected to a computer system (not shown) to process the data obtained with the optical cored wire 1 and the detector 10.

The molten metal bath 7 is contained in a vessel 11 which may be part of an electric arc furnace (EAF) or a converter known to those skilled in the art for the processing of molten metal. The optical cored wire 1 is led by moving means 12 through a guide tube 13 in the vessel 11 having an entry point 14. The moving means 12 comprises rollers for moving the optical cored wire 1 and may include a servo motor to drive at least one of the rollers. The shown configuration is used as an example, a lid 22 with a respective entry point 14 is not a pre-requisite for the present invention.

The shown configuration illustrates an exemplary measurement position p2 of the optical cored wire 1 with the leading tip 15 immersed below the surface of the molten metal bath $MB_S$. The angle of immersion of the optical cored wire 1 with respect to the surface of the molten metal bath $MB_S$ is 90° in the presented embodiment. However, the angle can vary depending on the construction details of the metallurgical facility.

The temperature of a part of the optical cored wire 1 extending from the coil 8 to the entry point of the vessel 14 can be considered to be low, which could be a temperature ranging from room temperature up to 100° C. Once passing the entry point 14 in the direction of the molten metal bath 7, a hot atmosphere of up to 1700° C. or even higher is first encountered, followed by a slag layer 17 which is in turn followed by the molten metal bath 7. The entry point 14 to the vessel could be equipped with a blowing lance 18 to prevent metal and slag penetration into the guiding tube 13.

The optimal level of the molten metal bath $MB_S$ may be approximately known for each metallurgical vessel by its design and mode of operation.

To obtain a temperature measurement, the optical cored wire 1 is fed with its leading tip at the immersion end 15 towards the molten metal bath 7 to the required immersion depth at position p2. In order to obtain reliable temperature measurements, it may be desired to measure at a more or less fixed immersion depth in the molten metal bath. A suitable feeding system 12 will accurately control the feeding velocity of the optical cored wire 1.

After a measurement sequence, the part of the optical cored wire immersed in the molten metal bath 19 will be molten and thereby consumed. The length of this part is indicated with $L_C$. It is to be understood, that the length $L_C$ correlates to the immersion depth, to which the optical cored wire is fed. After the measurement is taken, the part of the optical cored wire 20 located in the hot atmosphere and extending through the slag layer can be fed back into the direction of the coil 8 and can be reused for the next measurement. The length $L_D$ correlates to the length of the optical cored wire, which has been located inside the vessel but has not been consumed during a measurement. The total length of the optical cored wire $L_T$ which has been fed into the metallurgical vessel is the sum of the length which has been consumed L and the length $L_D$ of the optical cored wire, which has been located inside the vessel.

Figure 3:
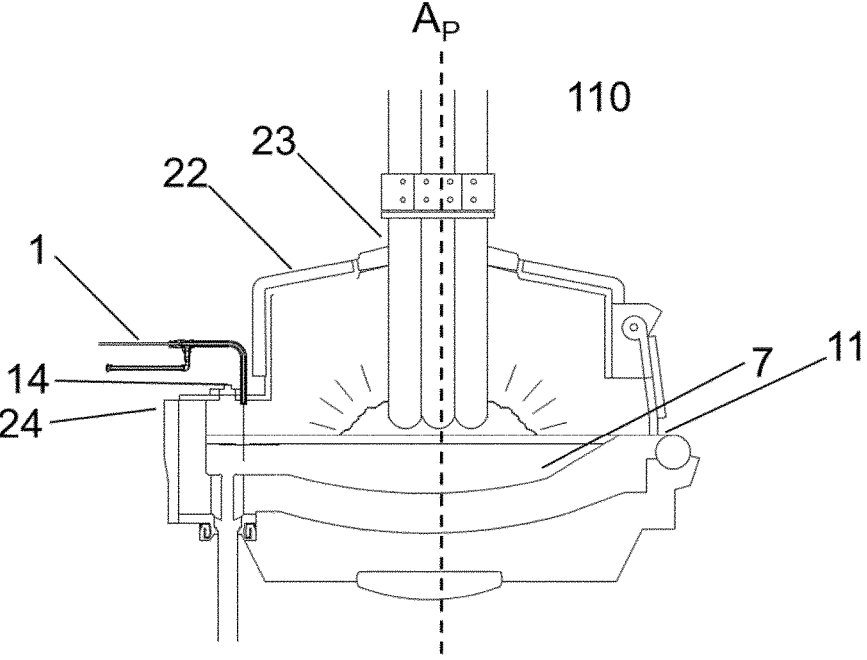
FIG. 3 shows a detailed schematic view of an electric arc furnace (EAF) with a typical installation to determine the temperature.

FIG. 3 shows a detailed schematic view of furnace 110, in particular an EAF, with a typical installation comprising an optical cored wire 1 for temperature measurements. An EAF used for steelmaking usually comprises a vessel 11 containing the molten metal bath 7, a removable lid 22 through which one or more electrodes 23 can enter the furnace and a platform 24 arranged on the side of the vessel 11. As shown in the view of the EAF, the body containing the molten metal bath 7 is not necessarily symmetrical to a central axis $A_P$ but can also be designed asymmetrical. The electrodes 23 employed to heat the metal are typically arranged above the vessel 11.

The entry point 14 through which the optical cored wire 1 enters the vessel 11 is arranged on the platform 24 in the shown configuration. The immersion device comprising the moving means 12 is also arranged on the platform 24 (not shown for the sake of clarity). The configuration shown illustrates the vessel 11 in a representative neutral position; i.e. without a tilting.

In such an EAF configuration in operation, i.e. with a load of metal which has been molten to a molten metal bath, the depth of the molten metal bath is in the range of 1 m and the distance from the entry point 14 to the surface of the molten metal bath in the range of 1-1.5 m. The typical inner diameter of such a vessel is between 6 m to 7 m, but larger installations with up to 9 m inner diameter are also common. The distance from the center of the EAF to the entry point 14, installed on a platform is in the range of 3 m-3.5 m. The numbers emphasize, that all Figures are not drawn to scale, but the items are shown in size ratios to clarify the circumstances leading to the present invention.

Figure 4:
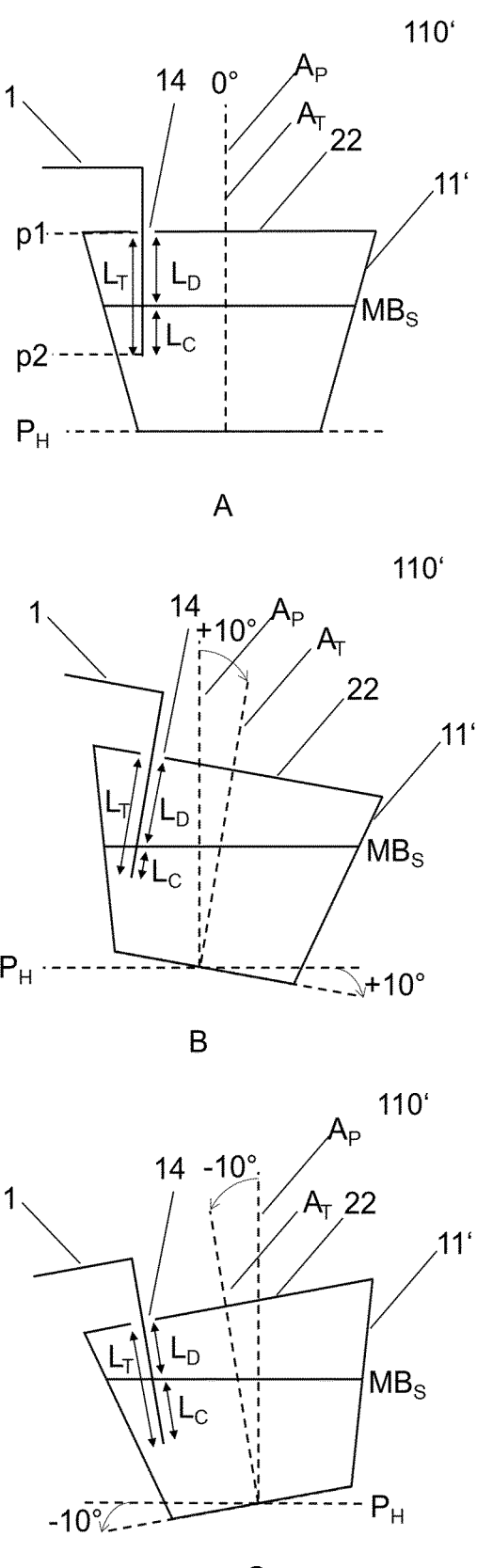
FIG. 4 shows schematic views of an exemplary metallurgical vessel with different degrees of furnace inclination.

FIG. 4 shows schematic views of an exemplary furnace 110' with a metallurgical vessel 11' with different degrees of furnace inclination. It may be understood that the elements and their proportions to each other are not drawn to scale, but to illustrate the invention in further detail. Typically, the tilting of the vessel is within the range of +3° to −3°, the tilting of 10° as shown in the figure was chosen for better clarification.

The optical cored wire 1 is guided into the vessel 11' through an entry point 14, which is located near a side wall of the vessel. The entry point 14 may also be at the same position as a first position p1, from which the feeding of the optical cored wire is initiated in exemplary measurement profiles. The position to which the leading tip of the optical cored wire is fed is marked with p2 in FIG. 4A, the marking was omitted in FIGS. 4 B and C for better clarity.

FIGS. 4A-C illustrate the relationships between the surface of the molten metal bath $MB_S$, a centered pivoting axis $A_P$ and a tilting axis $A_T$ the furnace inclination value is referred to and an horizontal plane $P_H$ which can also be used to define the furnace inclination value in different configurations of the vessel 11'. Furthermore, the total length of the optical cored wire $L_T$ entering the vessel 11', being defined as the sum of the length $L_C$ of the optical cored wire immersed under the surface of the molten metal bath $MB_S$ and the length $L_D$ of the optical cored wire entering the vessel 11' but not being immersed under the surface of the molten metal bath $MB_S$ are shown for the different furnace configurations.

FIG. 4A shows the vessel 11' in a representative neutral position, referring to a furnace inclination value of 0°. The pivoting axis $A_P$ is configured perpendicular to the bottom of the vessel 11' and is aligned with the tilting axis $A_T$. Both axes are perpendicular to a horizontal plane $P_H$ which is aligned with the bottom of the vessel 11'.

FIG. 4 B shows the vessel 11' in a position tilted to one side by 10°. The furnace inclination value is defined by the angle between the pivoting axis $A_P$ and the tilting axis $A_T$. Alternatively, the furnace inclination value can be defined by the angle between horizontal plane $P_H$ and the bottom of the vessel 11'.

FIG. 4 C shows the vessel 11' in a position tilted to the other side by 10°, per definition the furnace inclination value has a negative mathematical sign.

FIGS. 4A-C illustrate configurations, in which the total length of the optical cored wire $L_T$ entering the vessel 11' is constant. The tilting of the furnace influences the immersion depth of the leading tip of the optical cored wire 1, represented by the length $L_C$ of the optical cored wire immersed under the surface of the molten metal bath $MB_S$. The object of the present invention was to take this varying immersion depth with the moving furnace 110' into consideration when conducting a temperature measurement.

Figure 5:
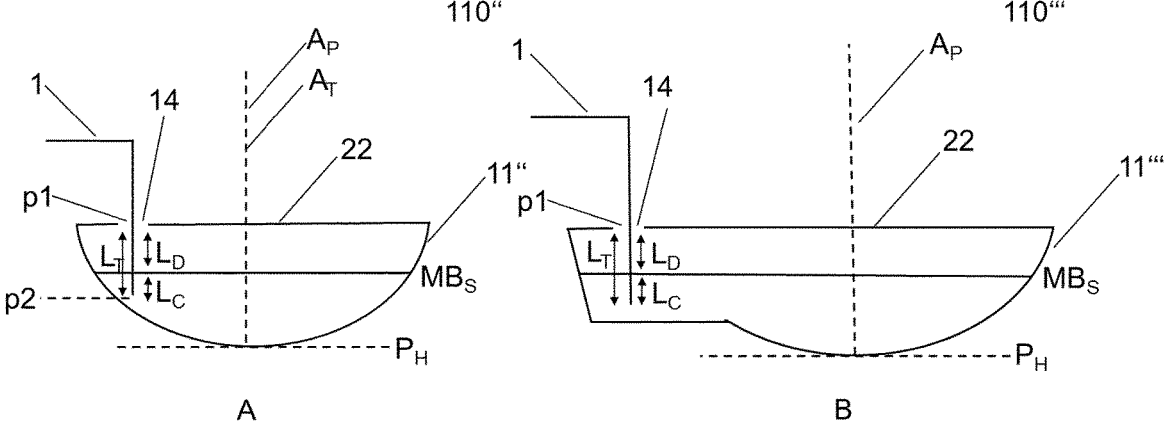
FIG. 5 illustrates further exemplary vessel geometries in relation to the pivoting axis $A_P$.

FIG. 5 illustrates further exemplary vessel geometries of metallurgical furnaces in relation to the pivoting axis $A_P$. Additional parts are not shown for clarity. FIG. 5A shows a furnace 110" with a round-bottomed vessel 11" with the pivoting axis $A_P$ centrally arranged in neutral position. In FIG. 5 B, a furnace 110''' with a non-symmetrical vessel 11''' is shown. When the vessel 11''' is tilted from the pivoting axis $A_P$, the level of the molten metal bath $MB_S$ will move to a different extend relative to the entry point 14 when tilted to one side or the other side.

Figure 6:
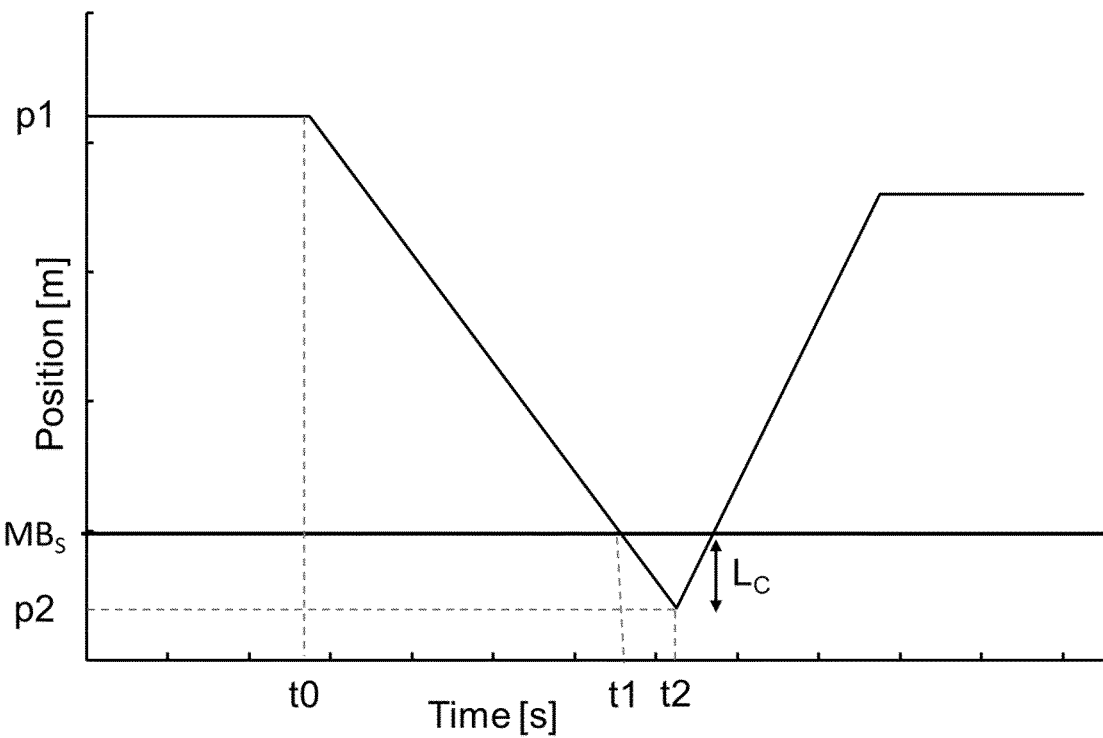
FIG. 6 shows a position-time graph indicating the immersion of the leading tip of the optical cored wire during the application of a representative measurement profile.
Figure 7:
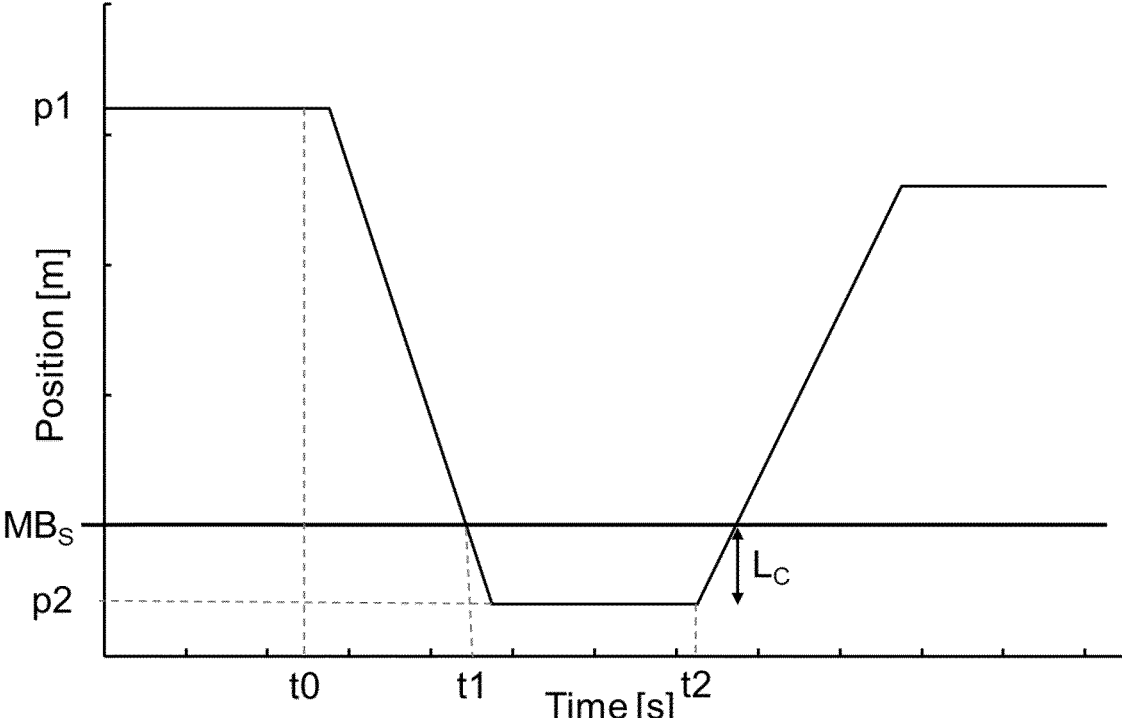
FIG. 7 shows a position-time graph indicating the immersion of the leading tip of the optical cored wire during the application of another representative measurement profile.

FIG. 6 shows a position-time graph indicating the immersion of the leading tip of the optical cored wire during the application of an exemplary measurement profile. The x-axis shows the time, whereas the y-axis indicates the position of the leading tip. The position of the surface of the molten metal bath $MB_S$ is indicated for orientation. Prior to the start of a measurement; i.e. prior to t0, the leading tip is positioned at a starting point, referred to as first position p1. This may be inside the metallurgical vessel and proximate the entry point; i.e. close to the point where the optical cored wire enters the vessel. The optical cored wire is fed for a duration from to t2 with a feeding velocity towards and into the molten metal bath to a second position p2. This duration is typically in the range of seconds. The leading tip of the optical cored wire enters the molten metal bath at a point in time t1, i.e. t1 is the point in time from which the leading tip is immersed below the surface of the molten metal bath. In the shown graph, a single feeding velocity is applied, but the feeding may comprise several phases with different feeding velocities. Even a phase without feeding; i.e. a stationary phase, can be included during the conduction of a measurement as indicated in the graph shown in FIG. 7, representing another preferred embodiment. The temperature measurement is obtained during a measurement time period during t1 to t2. The leading tip has to be immersed under the surface of the molten metal bath to obtain reliable measurements. It has been found, that providing the leading tip in a constant immersion depth at this point allows obtaining the most accurate results. Temperature values obtained in an early phase of the feeding may often be not representative for the bulk temperature of the molten metal bath. After t2, the optical cored wire is retracted from the molten metal bath back to a position above the surface. Ideally, the part of the optical cored wire immersed under the surface of the molten metal bath $L_C$ is consumed until t2.

For the given reasons, it is advantageous that the parameters of the feeding scheme are adjusted to the physical configuration of the metallurgical vessel which influence the relationship of the surface level of the molten metal bath and the positions of the leading tip of the optical cored wire from which a measurement sequence is initiated and to which it is fed when to obtain a measurement.

Applying the method according to the present invention will furthermore minimize the amount of optical cored wire which is consumed during a measurement sequence, since the immersion depth can be chosen in such a way, that only the minimal amount of optical cored wire is immersed under the surface of the molten metal bath and therefore consumed.

It has been observed that different parameters applied to obtain a temperature value during the application of a measurement profile deliver varying measurement qualities. The measurement quality of a measurement profile refers to different measurement accuracies compared to measurement values obtained by using a stationary installed standard thermocouple. The idea underlying the present invention is an adaption of the specific measurement profile to the circumstances present inside a metallurgical vessel at the point in time during which a measurement is taken.

Figure 8:
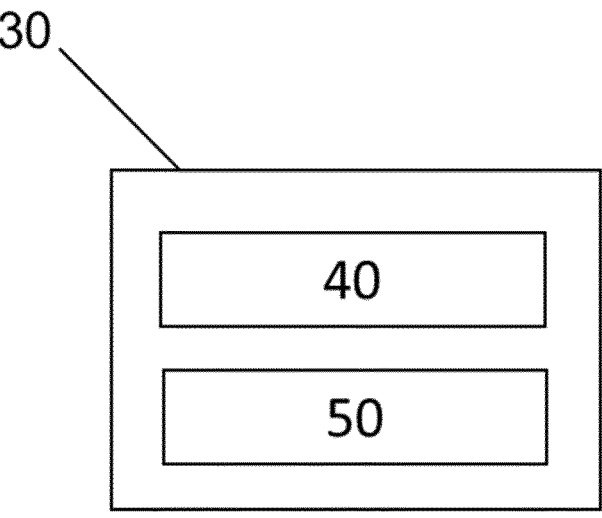
FIG. 8 shows a schematic view of a system according to an embodiment of the invention.

FIG. 8 shows a schematic view of a system 30 according to an embodiment of the invention. The system 30 is configured to perform the method according to the invention. In particular, it is configured to provide a set of data, relating data for the furnace inclination with measurement profiles which deliver optimal measurement qualities for the respective configuration of the furnace. The system 30 is further configured to determine the configuration, i.e. the inclination value of the furnace. Additionally, the system 30 is configured to choose a measurement profile from the provided set of data. Furthermore, the system 30 is configured to apply this measurement profile and obtain a temperature.

The system comprises a device 40, wherein the device 40 comprises an optical cored wire and a detector. Furthermore, the system comprises a module 50. Device 40 and module 50 are adapted to interact with each other; i.e. the module is configured to carry out the method according to the invention with the device 40, resulting in the measurement of temperature values of a molten metal bath.

Figure 9:
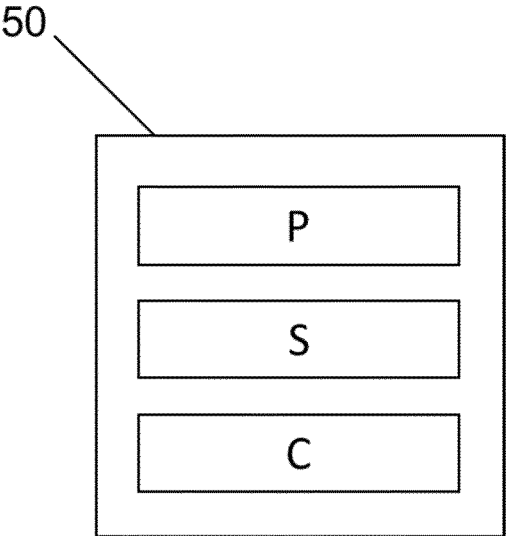
FIG. 9 shows a schematic view of a module according to an embodiment of the invention.

FIG. 9 shows a schematic of the module 50 in more detail. The module 50 comprises a storage unit S, a processing unit P and a controlling unit C.

LIST OF REFERENCE NUMERALS 1, 1', 1", 1'" Optical cored wire
2', 2", 2'" Optical fiber
3', 3", 3'" Metal tube
4", 4'" Second metal tube
5", 5'" Void space between metal tubes
6 Installation
7 Molten metal bath
8 Coil
9 Opposite end (end of cored wire connected to detector)
10 Detector
110, 110', 110", 110'" Furnace
11, 11', 11" Vessel; metallurgical container
12 Moving Means
13 Guide tube
14 Entry point
15 Leading tip of optical cored wire
$MB_S$ Surface of molten metal bath
17 Slag layer
18 Blowing lance
19 Part of the cored wire immersed in the molten metal bath
Part of cored wire subjected to hot atmosphere and slag
22 Removable Lid
23 Electrodes
24 Platform
30 System
40 Device
50 Module
S Storage unit
P Processing unit
C Controlling unit
$L_C$ Length of optical cored wire immersed in the molten metal bath
$L_D$ Length of optical cored wire located inside the vessel
$L_T$ Total length of optical cored wire fed into the vessel
p1 Initial position of the leading tip of the optical cored wire
p2 Position to which the leading tip of optical cored wire is fed to under surface of molten metal bath
$A_P$ Pivoting axis
$A_T$ Tilting axis
$P_H$ Horizontal Plane

The invention claimed is:

1. A method for measuring the temperature of a molten metal bath in a furnace with a device comprising an optical cored wire and a detector, wherein the furnace has a furnace inclination, the method comprising:
    (a) providing a set of data relating furnace inclination values Fl to corresponding measurement profiles MP;
    (b) determining a furnace inclination value Fl(n) for a point in time t(n);
    (c) choosing a measurement profile MP(n) corresponding to the furnace inclination value Fl(n) from the provided set of data relating furnace inclination values Fl to corresponding measurement profiles MP; and
    (d) applying the measurement profile MP(n) at a point in time t(n) to obtain a measured temperature value.

2. The method according to claim 1, wherein a measurement profile MP defines at least a step of providing the leading tip of the optical cored wire at a first position p1 above the surface of the molten metal bath.

3. The method according to claim 1, wherein a measurement profile MP defines at least a step of feeding the leading tip of the optical cored wire from a first position p1 towards the molten metal bath to a second position p2.

4. The method according to claim 3, wherein the second position p2 is in an immersion depth il under the surface of the molten metal bath.

5. The method according to claim 1, wherein the set of data relating furnace inclination values Fl to corresponding measurement profiles MP relates the definition of at least one parameter in at least one step of a measurement profile MP to a furnace inclination value Fl.

6. The method according to claim 3, wherein the distance between the first position p1 and the second position p2 in the measurement profile MP(n) relates to the furnace inclination value Fl(n).

7. The method according to claim 3, wherein the distance between the first position p1 and the second position p2 is adapted by the same length for each degree of inclination of the furnace in a first direction and in a second direction from a predetermined initial position.

8. The method according to claim 3, wherein the distance between the first position p1 and the second position p2 is adapted by a first length for each degree of inclination of the furnace in a first direction and adapted by a second length for each degree of inclination of the furnace in a second direction from a predetermined initial position.

9. The method according to claim 3, wherein the distance between the first position p1 and the second position p2 is adapted by 2 cm to 20 cm for each degree of inclination of the furnace from a predetermined initial position.

10. The method according to claim 1, wherein the measurement profile MP defines at least a step within a stationary time period within two points in time t0 and t2, during which the feeding of the leading tip of the optical cored wire is paused with or the leading tip of the optical cored wire is fed with a low speed.

11. The method according to claim 1, wherein the measurement profile MP defines at least a step of obtaining temperature information within a measuring time period within two points in time t0 and t2.

12. The method according to claim 1, wherein the measurement profile MP defines at least one feeding velocity $V_{fed}$ with which the leading tip of the optical cored wire is fed to a second position p2 from a first position p1 towards the molten metal bath.

13. The method according to claim 1, wherein the set of data provided in step (a) further relates the level of the surface of the molten metal bath to the measurement profiles MP.

14. The method according to claim 1, wherein the set of data provided in step (a) further relates the position of the leading tip of the optical cored wire to the measurement profiles MP.

15. A system for determining a temperature value of a molten metal bath in a furnace in a method according to claim 1, the system comprising:

a processing element P1 for determining the furnace inclination values Fl;

a processing element P2 for choosing a measurement profile MP(n) corresponding to a furnace inclination Fl(n) from the provided set of data relating the furnace inclination values Fl to corresponding measurement profiles MP; and a controlling unit C comprising a controlling element C1 for applying the measurement profile MP(n) to obtain a measured temperature value.

16. The method according to claim 3, wherein the distance between the first position p1 and the second position p2 is adapted by 5 cm to 15 cm for each degree of inclination of the furnace from a predetermined initial position.

17. The method according to claim 3, wherein the distance between the first position p1 and the second position p2 is adapted by 8 cm to 12 cm for each degree of inclination of the furnace from a predetermined initial position.

* * * * *